No. 615,123. Patented Nov. 29, 1898.
B. R. ADKINS & C. WINDSOR.
APPARATUS FOR INFLATING PNEUMATIC TIRES.
(Application filed Aug. 5, 1896.)
(No Model.) 2 Sheets—Sheet 1.
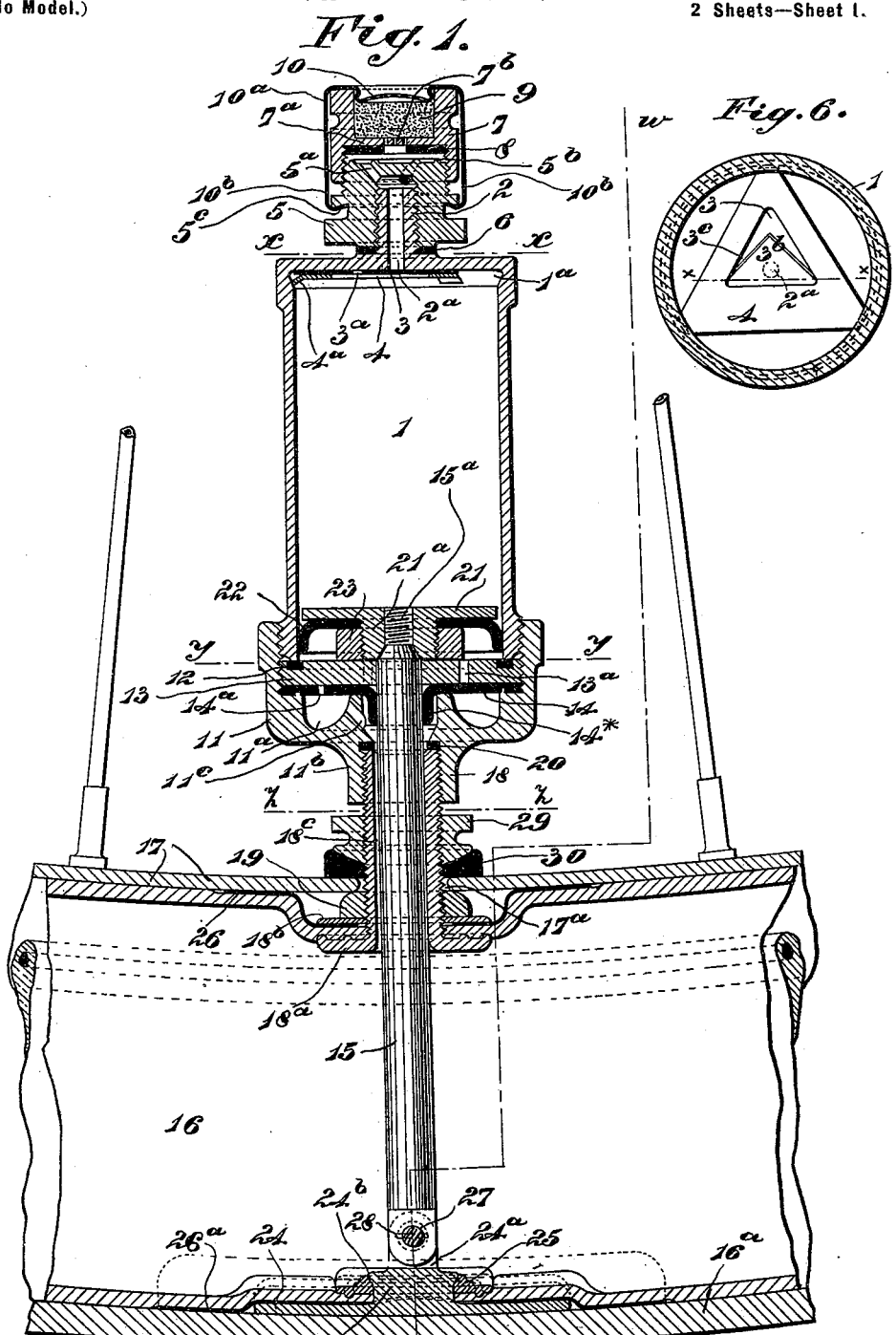
Witnesses. Inventors.

No. 615,123. Patented Nov. 29, 1898.
B. R. ADKINS & C. WINDSOR.
APPARATUS FOR INFLATING PNEUMATIC TIRES.
(Application filed Aug. 5, 1896.)
(No Model.) 2 Sheets—Sheet 2.
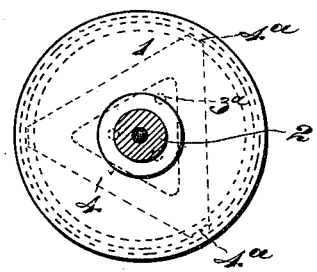
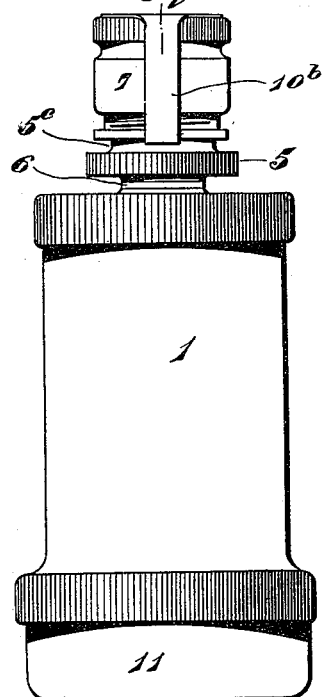
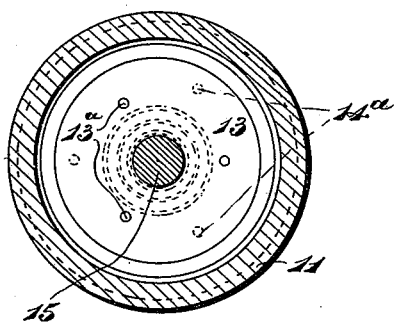
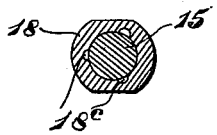
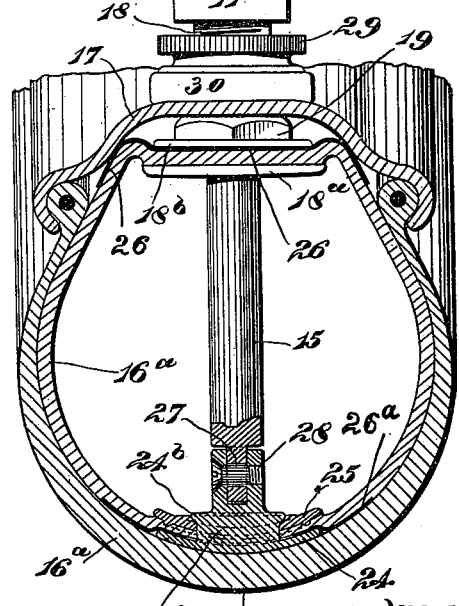

UNITED STATES PATENT OFFICE.

BENJAMIN RATCLIFFE ADKINS AND CHARLES WINDSOR, OF LONDON, ENGLAND.

APPARATUS FOR INFLATING PNEUMATIC TIRES.

SPECIFICATION forming part of Letters Patent No. 615,123, dated November 29, 1898.

Application filed August 6, 1896. Serial No. 601,723. (No model.)

*To all whom it may concern:*

Be it known that we, BENJAMIN RATCLIFFE ADKINS, residing at Lewisham, and CHARLES WINDSOR, residing at Brockley, London, in the county of Kent, England, subjects of the Queen of Great Britain and Ireland, have invented Improvements in Apparatus for Inflating Pneumatic Tires, of which the following is a specification.

This invention has reference to a construction of apparatus for automatically inflating a pneumatic tire and maintaining a practically constant pressure therein during the rotation of the wheel to which the tire and apparatus are applied, according to which air is drawn past a suction-valve into a pump-cylinder attached to the wheel-rim and is delivered into the pneumatic tire past a delivery-valve by a piston the rod of which extends partly through the tire and is attached to the outer peripheral or tread portion thereof, the arrangement being such that while the tire is only partly inflated the piston will be moved inward in its cylinder and air therein will pass to the outer side of the piston each time the portion of the tread of the tire to which the outer end of the piston-rod is attached is moved inward by pressure against the ground upon which the wheel runs, and the air that has thus passed to the outer side of the piston will upon further rotation of the wheel be forced into the pneumatic tire past the delivery-valve by the outward movement of the piston, caused by the pressure of the air in the tire acting against a larger area than that of the piston, the supply of air automatically ceasing when the tire has been sufficiently inflated.

The terms "inner" and "outer" as herein used in connection with the pump-cylinder, piston, and piston-rod are relative to the center of the wheel to which the apparatus is applied.

As will be obvious, apparatus to operate in the manner described can be constructed in various forms.

Figure 1 of the accompanying drawings is a part longitudinal section on the line $v\,v$ of Fig. 2, and Fig. 2 is a sectional elevation on the line $w\,w$ of Fig. 1, showing, to an enlarged scale, one arrangement of inflating apparatus according to this invention applied to a cycle-wheel rim fitted with a pneumatic tire. Figs. 3, 4, and 5 are cross-sections on the lines $x\,x$, $y\,y$, and $z\,z$, respectively, of Fig. 1. Fig. 6 is an inverted sectional plan showing a modified form of suction-valve.

The inflating apparatus comprises a pump-cylinder 1, provided at its closed inner end with an air-inlet nozzle 2, controlled by a suction-valve that may advantageously consist of a piece 3 of sheet material, such as india-rubber or leather, that is located within the cylinder, is formed with perforations $3^a$ out of line with the bore $2^a$ of the nozzle, and is held against the inner end of the cylinder by a holding device that is fixed within the cylinder without the aid of screws or like fastenings extending to the exterior thereof. In the arrangement shown the suction-valve 3 is formed of a triangular-shaped piece of india-rubber formed with three perforations $3^a$, having their axes in a circle concentric to but at some distance from the air-inlet opening $2^a$, Fig. 3, the valve being held in place by a triangular-shaped metal frame 4, that is fixed in place by forcing its three ends $4^a$ into an undercut recess $1^a$ in the corresponding end of the pump-cylinder 1. The air-inlet nozzle 2, which is externally screw-threaded, as shown, to enable an ordinary air-pump or inflator to be screwed thereto for partly inflating the tire, if necessary, at starting, is provided with a screw-cap 5, formed at one end with inclined air-passages $5^a$, that are arranged about the axis of the cap and communicate with the interior thereof. Between the screw-cap 5 and the cylinder is a packing-ring 6 of suitable material, such as leather or india-rubber. Upon the cap is screwed an adjustable air-closure and filtering device 7, which is preferably made, as shown, in the form of an internally-screw-threaded nut with a transverse division $7^a$, which is perforated at the center $7^b$ and which divides the interior of the nut into two compartments. The compartment next the screw-cap 5 is provided with a washer 8 of packing material, which when the nut is tightened up is compressed between the division $7^a$ in the nut and annular ridges $5^b$ on the adjacent end of the screw-cap 5, so as to then effectually close the air-inlet passages $5^a$ in the latter. The outer compartment, through which the air drawn into the pump-cylinder 1 on the suction stroke of the pump-piston passes, is charged with filtering material 9, such as cotton-wool, retained in place by a removable perforated metal disk 10, which is forced into the said outer compartment. The nut 7 is prevented from leaving the screw-cap 5 by metal clip-pieces $10^a$, that may, as shown, be formed in one piece with the perforated disk 10 and which have their free ends $10^b$ extending into an annular groove $5^c$ in the screw 5.

The outer end of the pump-cylinder 1 is screwed into a valve-box 11 and abuts against a packing-ring 12 in a perforated valve-plate 13, which is also screwed into the valve-box 11. Between the valve-plate 13 and the outer end portion of the valve-box 11 is clamped the main air or delivery valve 14, which consists of a ring of material such as leather or india-rubber, provided at its central part with a tubular portion $14^*$, that fits the piston-rod 15, which works through it and the valve-plate. The valve-plate 13 and valve 14 are each formed with air holes or passages $13^a$ and $14^a$, respectively, Fig. 4, those, $14^a$, in the valve being arranged between those, $13^a$, in the plate and with their axes in a circle of different diameter to that containing the axes of the holes $13^a$, so that the holes in the one can never be accidentally placed over the holes in the other. The holes $14^a$ in the valve 14 are opposite an annular recess $11^a$ in the end of valve-box 11, which is provided with a tubular extension $11^b$, with which the said recess communicates by inclined air-passages $11^c$.

The air-pump cylinder 1, with valves 3 and 14, as described, is connected to a pneumatic tire 16 $16^a$ and a wheel-rim 17 by being screwed upon the inner end of a tubular stem 18, which passes through the wheel-rim and is provided at its outer end with a head $18^a$, between which and a metal washer $18^b$ thereon the air-tube 16 of the tire, or simply the tire in the case of a single-tube tire, is tightly clamped by a nut 19. A tight joint is produced between the stem 18 and valve-box 11 by a packing-ring 20.

The pump-piston 21 is constructed with a cupped leather ring 22, held in place by a nut 23, screwed on a boss $21^a$ on the piston. The inner end $15^a$ of the piston-rod is screwed on the said boss and the other end of the rod extends outward through the tubular stem 18, which it fits and in which are airways $18^c$, Fig. 5, in communication with the interior of the tire. At its outer end the piston-rod 15 is connected to the outer peripheral portion of the pneumatic tire by a rigid connection, the area of which that is subjected to the air-pressure within the tire is greater than the cross-sectional area of the pump-piston 21, so that after the piston has been forced inward by pressure of the tire against the ground and air has consequently passed to the outer side of the piston the air pressure within the tire, acting on the said connection, will be more than sufficient to cause the piston to make its outstroke and compress the air at its outer side into the tire.

In the example shown the pump-piston is connected to a stem $24^a$, that extends inwardly through the outer periphery of the air-tube 16 and is formed on a plate 24, that is curved both in a longitudinal direction and in a transverse direction, as shown, and is of larger area than the pump-piston 21. Between this plate 24 and a washer 25 the air-tube is tightly clamped, preferably by riveting or flanging, as shown, the edge $24^b$ of the boss $24^c$ carrying the stem tightly over the washer 25, which may also be curved in a longitudinal and a transverse direction. The connection between the piston-rod 15 and air-tube 16 is covered by the tire-cover $16^a$, which may be of any suitable construction.

26 and $26^a$ are pieces of canvas secured to the air-tube to strengthen it where it is secured to the stem 18 and plate 24, respectively.

To enable the piston-rod 15 to move and accommodate itself when in use to longitudinal and transverse movements of the part of the tire to which it is attached, its outer end is pivotally connected to the plate by which it is connected to the outer peripheral portion of the tire, so that it can move relatively to such plate in the longitudinal direction, and the tubular stem 18, carrying the valve-box 11 and attached parts, is so mounted and arranged that it can rock or oscillate in all directions on the wheel-rim 17, to which it is attached. The outer end of the piston-rod may for the purpose mentioned be connected to the stem $24^a$ of the plate 24 by a tongue-and-groove joint, as shown at 27, Fig. 2, through which passes a pivot-pin 28, one end of which is screwed into the stem and then riveted over or expanded to prevent it becoming loose. To enable the stem 18 to rock or oscillate on the wheel-rim, it is provided at the inner periphery of the said rim with a screw-nut 29, having a spherical outer surface that bears against a washer 30 of suitable elastic material—for example, india-rubber—that is interposed between it and the wheel-rim, and on the correspondingly-formed surface of which it can rock or oscillate in any direction. The side of the nut 19 that serves to clamp the said tubular stem to the air-tube is also made of rounded or convex form on the side next the wheel-rim, so as to permit it to rock thereon, and the hole $17^a$ in the wheel-rim 17, through which the stem 18 passes, is made sufficiently large to enable the stem to oscillate in any direction. The said stem 18 may be formed with flat surfaces at two opposite parts to facilitate the screwing together of the various parts.

With the arrangement described it will be seen that when the wheel is in motion and the tire is partly deflated the piston will be alternately moved inward by pressure of tire against the ground and immediately afterward will be forced outward by the pressure of the air within the tire acting against the plate 24, so that, assuming the nut 7 to have been partly unscrewed, air will be pumped into the tire until it is fully inflated and only a slight inward movement of the tire is produced at the point of contact with the ground, whereupon further entrance of air will automatically cease and the nut 7 can be screwed up tight against the cap 5 to prevent any leakage at this point. To deflate the tire, all that is necessary is to partly unscrew the valve-chamber 11 from the stem 18.

The degree of pressure to which air will be compressed in the tire by the apparatus hereinbefore described before such apparatus will automatically cease to act can be regulated by suitably varying the volume of the air-space between the piston and the delivery-valve when the piston is at the end of its outstroke. The greater this volume the less will be the final air-pressure in the tire. The volume of the air-space can be varied by using piston-nuts 23 of different diameters.

By catching hold of the tire at the part where the piston-rod is connected to it and reciprocating the piston by hand the apparatus can be used for partly inflating the tire without the use for this purpose of a separate air-pump. To facilitate this operation, the screw-cap 5 may be removed from the pump-cylinder and a pin capable of being carried in the pocket can be passed through the air-inlet pipe 2 and suction-valve 3, so as to bear against the inner side of the piston. Then upon a person placing the piston-rod, piston, and pin between the finger and thumb of one hand the piston can be readily and quickly reciprocated and air caused to enter the tire. In this case to permit of the passage of the pin the suction-valve 3 instead of being perforated should have cut therein two slits $3^b$, as shown in Fig. 6, these slits being arranged at an angle to each other, so as to form an angular flap portion $3^c$, that is capable of being turned about a line $x\ x$, that is preferably arranged tangentially to the air-hole $2^a$, as seen in plan.

As will be obvious, some of our improvements may be used without the others, and some of the parts may be modified to adapt them to different constructions of pneumatic tires. Thus in the case of a single-tube tire the plate 24, connected to the outer peripheral portion of the tire, may be arranged to be embedded in the fabric of the tire during the formation thereof.

In all cases where it is desired to clamp a packing-ring, valve, air-tube, or the like of yielding material in an air-tight manner between two metal parts it is advantageous to provide one of the metal parts with a ridge or ridges $5^b$, that will embed itself in the material. The other metal part may be provided with a corresponding groove or not, as desired.

What we claim is—

1. Apparatus for automatically inflating pneumatic tires comprising an air-pump having its cylinder adapted to be attached to a wheel-rim, its delivery-valve arranged to be located between the pump-piston and the tire of the wheel to which the apparatus is to be applied, and its piston-rod extending past said delivery-valve and arranged to extend through the wheel-rim and across and within the tire, the outer end of said rod being adapted to be connected to the outer peripheral or tread portion of said tire so as to be reciprocated by inward and outward movement thereof, substantially as herein described.

2. Apparatus for automatically inflating pneumatic tires comprising an air-pump having its cylinder adapted to be pivotally attached at one end to a wheel-rim so that it can rock or oscillate thereon, its delivery-valve arranged between the pump-piston and the pivoted end of said cylinder and its piston-rod arranged to extend through the pivoted end of said cylinder and across and within the pneumatic tire and adapted to be flexibly but positively connected to the outer peripheral or tread portion thereof so as to be reciprocated by inward and outward movement thereof, substantially as herein described.

3. Apparatus for automatically inflating pneumatic tires comprising an air-pump having its cylinder adapted at its outer end to be attached to a wheel-rim, its delivery-valve arranged to be between the pump-piston and the tire with which the apparatus is to be used, and its piston-rod arranged to extend through the said outer end of the cylinder and provided at its outer extremity with an attachment whereby the same can be connected to the outer peripheral or tread portion of said tire, the area of said attachment that is subject to the air-pressure in the tire being greater than that of the pump-piston, substantially as herein described for the purpose specified.

4. Apparatus for inflating pneumatic tires, comprising an air-pump adapted to be pivotally secured to a wheel-rim so that it can rock or oscillate thereon and having its piston-rod in rigid connection with the piston and extending through the outer end of the pump-cylinder and the pivotal connection of the pump-cylinder so as to extend directly into the tire to which the apparatus is applied, and a fastening device pivoted to the outer end of said piston-rod and adapted to be secured to the outer peripheral or tread portion of said tire so as to form therewith a rigid connection of greater effective area than that of the pump-piston, substantially as described for the purpose specified.

5. The combination with a wheel-rim and pneumatic tire thereon of an inflating apparatus comprising an air-pump cylinder attached to the wheel-rim and provided with suction and delivery valves at its inner and outer ends respectively, a pump-piston, and a piston-rod that extends through the outer end of said cylinder and through the wheel-rim into said tire and is connected with said piston and the outer peripheral or tread portion of the tire so that the piston will be reciprocated by inward and outward movement of the portion of the tire to which it is connected, substantially as herein described for the purpose specified.

6. The combination with a wheel-rim and pneumatic tire thereon, of an air-pump having its cylinder pivotally attached to the wheel-rim, its delivery-valve arranged between the pump-piston and said tire and its piston-rod extending directly through said cylinder and wheel-rim into said tire and flexibly but directly connected to the outer peripheral or tread portion thereof so as to be reciprocated by inward and outward movement thereof, substantially as described for the purpose specified.

7. The combination with a wheel-rim and pneumatic tire thereon, of an air-pump cylinder pivotally secured to the wheel-rim so that it can rock or oscillate thereon and provided with suction and delivery valves at its inner and outer ends respectively, a piston fitted to work in said cylinder and adapted to permit air to pass to its outer or delivery side when making its inward stroke, a piston-rod in direct connection with said piston, and a plate fixed to the outer peripheral portion of the tire and flexibly connected to the outer end of said piston-rod, the effective area of said plate exposed to the action of the air-pressure within said tire being greater than that of said piston, substantially as described for the purposes specified.

8. In apparatus for automatically inflating pneumatic tires, the combination with an externally-screw-threaded air-inlet pipe 2, of a suction-valve at the inner end of said pipe, a cap 5 screwed on said pipe 2 and formed with air-passages $5^a$, a packing-ring 6 between said cylinder and cap, a nut 7 screwed on said cap and formed with a centrally-perforated division $7^a$ dividing the interior of said nut into two compartments, a packing-ring 8 in the compartment next the screw-cap, air-filtering material 9 in the other compartments, a perforated plate 10 confining said filtering material in place, and metal clip-pieces $10^a$ for limiting the endwise movement of said nut, substantially as described.

9. Apparatus for inflating pneumatic tires, comprising an air-pump adapted to be secured to a wheel-rim and to the inner peripheral portion of a pneumatic tire with its delivery-passage in communication with the interior of the latter, and with its piston-rod extending through the connection into the tire, and a clamping device pivoted to the piston-rod so that it can turn relatively thereto in the direction of the length of the tire and comprising clamping-plates between which a part of the outer periphery or head of the tire can be securely clamped, substantially as described.

10. Apparatus for inflating pneumatic tires, comprising an air-pump cylinder with suction-valve at one end thereof a valve-box screwed to its other end, a perforated valve-supporting plate located at the delivery end of said cylinder, a delivery-valve controlling the passage of air through said plate a central tube of flexible material secured between said plate and valve-box, an air-delivery passage extending around said central tube a hollow stem adapted to be secured in a detachable manner to the valve-box to a wheel-rim and to a pneumatic tire and having its interior in communication with said air-delivery passage and the interior of said tire, and a pump-piston provided with a cupped ring and having its rod extending through said plate, central tube and stem and adapted to be connected to the tire, substantially as herein described.

11. In apparatus for inflating pneumatic tires, an air-pump cylinder 1, a valve-box 11 screwed to the delivery end thereof, and having an annular recess $11^a$ therein a tubular extension $11^b$ and holes $11^c$ connecting said recess with the delivery-passage through said extension, a perforated metal plate 13 secured between said cylinder end and valve-box and a valve 14 of perforated flexible material secured between the edges of said annular recess and said plate and having a tubular extension $14^*$ through which and said plate the pump-piston extends.

12. In apparatus for inflating pneumatic tires, an air-pump comprising a cylinder with tubular extension, an externally-screwed hollow stem screwed at one end into said extension and provided at its other end with a head $18^a$ and a clamping-plate $18^b$, a packing-ring 20 between said cylinder end and stem, and nuts 19 and 29 screwed on said stem and having their adjacent ends rounded, substantially as described for the purpose specified.

13. In apparatus for inflating pneumatic tires an air-pump comprising a cylinder, a hollow stem connected to said cylinder and adapted to be connected to a wheel-rim and to a pneumatic tire, a pump-piston having its rod extending through said stem, and a clamping device comprising a plate 24 with stem jointed to the outer end of said piston-rod and of larger area than said piston and a clamping-plate 25 adapted to be secured to said plate substantially as described for the purpose specified.

In testimony whereof we have signed our names to this specification in the presence of subscribing witnesses.

BENJAMIN RATCLIFFE ADKINS.
CHARLES WINDSOR.

Witnesses:
PERCY ERNA HOCHS,
EDMUND S. SNEWIN,
E. C. JENKS.